(12) United States Patent
Nagata et al.

(10) Patent No.: US 7,744,810 B2
(45) Date of Patent: Jun. 29, 2010

(54) MICROWAVE IRON-MAKING FURNACE

(75) Inventors: Kazuhiro Nagata, Kanagawa (JP); Motoyasu Sato, Toki (JP)

(73) Assignees: Tokyo Institute of Technology, Tokyo (JP); Inter-University Research Institute Corporation National Institutes of Natural Sciences, Tokyo (JP)

( * ) Notice: Subject to any disclaimer, the term of this patent is extended or adjusted under 35 U.S.C. 154(b) by 0 days.

(21) Appl. No.: 12/219,942

(22) Filed: Jul. 30, 2008

(65) Prior Publication Data

US 2009/0039572 A1    Feb. 12, 2009

(30) Foreign Application Priority Data

Aug. 1, 2007    (JP) .............................. 2007-201388

(51) Int. Cl.
*C22B 1/00* (2006.01)
(52) U.S. Cl. ....................................... 266/242; 266/200
(58) Field of Classification Search ................. 266/200, 266/242, 280, 286
See application file for complete search history.

(56) References Cited

U.S. PATENT DOCUMENTS

| | | | | |
|---|---|---|---|---|
| 4,205,197 A | * | 5/1980 | Omori et al. ................ | 266/242 |
| 6,277,168 B1 | * | 8/2001 | Huang et al. ................ | 75/10.13 |

FOREIGN PATENT DOCUMENTS

| | | |
|---|---|---|
| JP | 6-116616 | 4/1994 |
| JP | 11-229007 | 8/1999 |
| WO | WO 89/04379 | 5/1989 |
| WO | WO 00/00311 | 1/2000 |
| WO | WO 02/079529 A1 | 10/2002 |
| WO | WO 03/042616 A1 | 5/2003 |

OTHER PUBLICATIONS

European Search Report dated Oct. 31, 2008.
Holocombe and Dykes: "Importance of "casketing" for microwave sintering of materials." Journal of Materials Science Letters, No. 9, 1990, pp. 425-428, XP002499745 United States.

* cited by examiner

*Primary Examiner*—Scott Kastler
(74) *Attorney, Agent, or Firm*—McGinn IP Law Group, PLLC

(57) ABSTRACT

A reactor has a casing composed of a magnesia-based refractory, and a bottom plate composed of an MgO-graphite mixed refractory is disposed on a bottom part of this casing. A graphite crucible is provided at a bottom of the reactor, and the graphite crucible and the reactor are joined together by a magnesia cylinder. Iron ore powder, coal powder, and other such raw materials supplied into the reactor are irradiated with microwaves from microwave oscillators and are heated. The iron ore is reduced, and the resulting molten pig iron flows out through a hole into a crucible, and then is poured out of the crucible through another hole into a ladle. It is thereby possible to manufacture molten pig iron with high energy efficiency, instead of using blast-furnace iron-making.

4 Claims, 1 Drawing Sheet

MICROWAVE IRON-MAKING FURNACE

BACKGROUND OF THE INVENTION

1. Field of the Invention

The present invention relates to an iron-making furnace for obtaining pig iron from iron ore, and particularly relates to a microwave iron-making furnace in which a raw material containing iron ore and coal is heated and melted by microwaves, and the iron ore is reduced to carbon to obtain pig iron.

2. Description of the Related Art

In the steel industry, melted pig iron is usually obtained through blast-furnace iron-making. Specifically, pellets made from iron ore, which is an iron oxide (ferric oxide or ferrous oxide etc.), coke or the like as a carbon source, which is a reducer, and limestone; are loaded into the top of a blast furnace (smelting furnace), hot air (air) is blown in through the tuyere at the bottom of the blast furnace, and an upward flow of hot air is formed in the blast furnace. The falling pellets are heated by the hot air, and the iron ore is reduced by a reaction between the iron ore and the coke. The reduced iron is melted to obtain melted pig iron, which accumulates at the bottom of the blast furnace. After a certain amount of pig iron has accumulated, the pig iron at the bottom of the furnace is taken out through a tapping hole in the bottom of the furnace, and the pig iron flows through a runner channel to be accommodated in a ladle (for example, Japanese Patent Application Kokai Publication No. H11-229007).

However, conventional blast-furnace iron making has had problems in that reducing and melting iron ore requires six hours or more at a temperature of about 1600° C., which is not energy-efficient.

Japanese Patent Application Kokai Publication No. H6-116616 discloses a method for manufacturing an iron powder by using microwaves to heat and reduce iron oxide. In this method for manufacturing an iron powder, iron ore, mill scale, or another such iron oxide that has been crushed; a microwave high-dielectric-constant material as a carbon source whose primary component is coke, char, activated carbon, powdered carbon, or another form of carbon; and calcium carbonate, magnesium carbonate, sodium carbonate, or another carbonate are mixed together. This mixture is irradiated with microwaves to internally heat the carbon source to a temperature in excess of 900° C., and the mixture reacts with the $CO_2$ gas produced by pyrolysis of the carbonate in the mixture to produce CO gas. The iron oxide is reduced by this CO gas to produce an iron powder.

However, the method for manufacturing an iron powder by using microwaves as disclosed in Japanese Patent Application Kokai Publication No. H6-116616 is a method in which iron ore or another iron oxide, coke or another carbon source, and a carbonate are mixed and heated by microwaves, the carbon source is internally heated to a temperature in excess of 900° C., CO gas is produced by a reaction between the carbon source and the $CO_2$ gas resolved from the carbonate in the mixture, and the ion oxide is reduced by this CO gas, but the iron ore, the coke, and the like are not melted. Therefore, with this method, it is only possible to merely manufacture an iron powder, and large amounts of molten pig iron cannot be manufactured efficiently.

SUMMARY OF THE INVENTION

An object of the present invention is to provide, in place of a blast furnace iron-making method, a microwave iron-making furnace that can manufacture molten pig iron with high energy efficiency.

The microwave iron-making furnace according to the present invention comprises a reactor having a casing composed of a magnesia-based refractory; microwave oscillators for irradiating the interior of the reactor with microwaves; a raw material supply apparatus for supplying a raw material containing iron ore and a carbon source to the interior of the reactor; and an extraction part for extracting molten iron from the reactor.

In this microwave iron-making furnace, it is preferable that the extraction part be a hole opened in the bottom of the reactor, and that a crucible made of graphite for receiving molten pig iron that flows out through the hole be provided below the reactor.

Furthermore, it is preferable that a cylinder composed of a magnesia-based refractory be provided between the crucible and the bottom surface of the reactor, and that a space enclosed by the reactor, the cylinder, and the crucible be formed below the reactor. In this case, a nozzle is formed in the bottom surface of the crucible, and molten pig iron flowing out of the reactor into the crucible is poured from the nozzle into a ladle provided below the nozzle.

According to the present invention, an object is to provide a microwave iron-making furnace wherein microwaves can be used to heat iron ore and coke, coal, or another such raw material with high efficiency, and molten pig iron can be produced with high energy efficiency.

DESCRIPTION OF THE PREFERRED EMBODIMENTS

Figure 1:
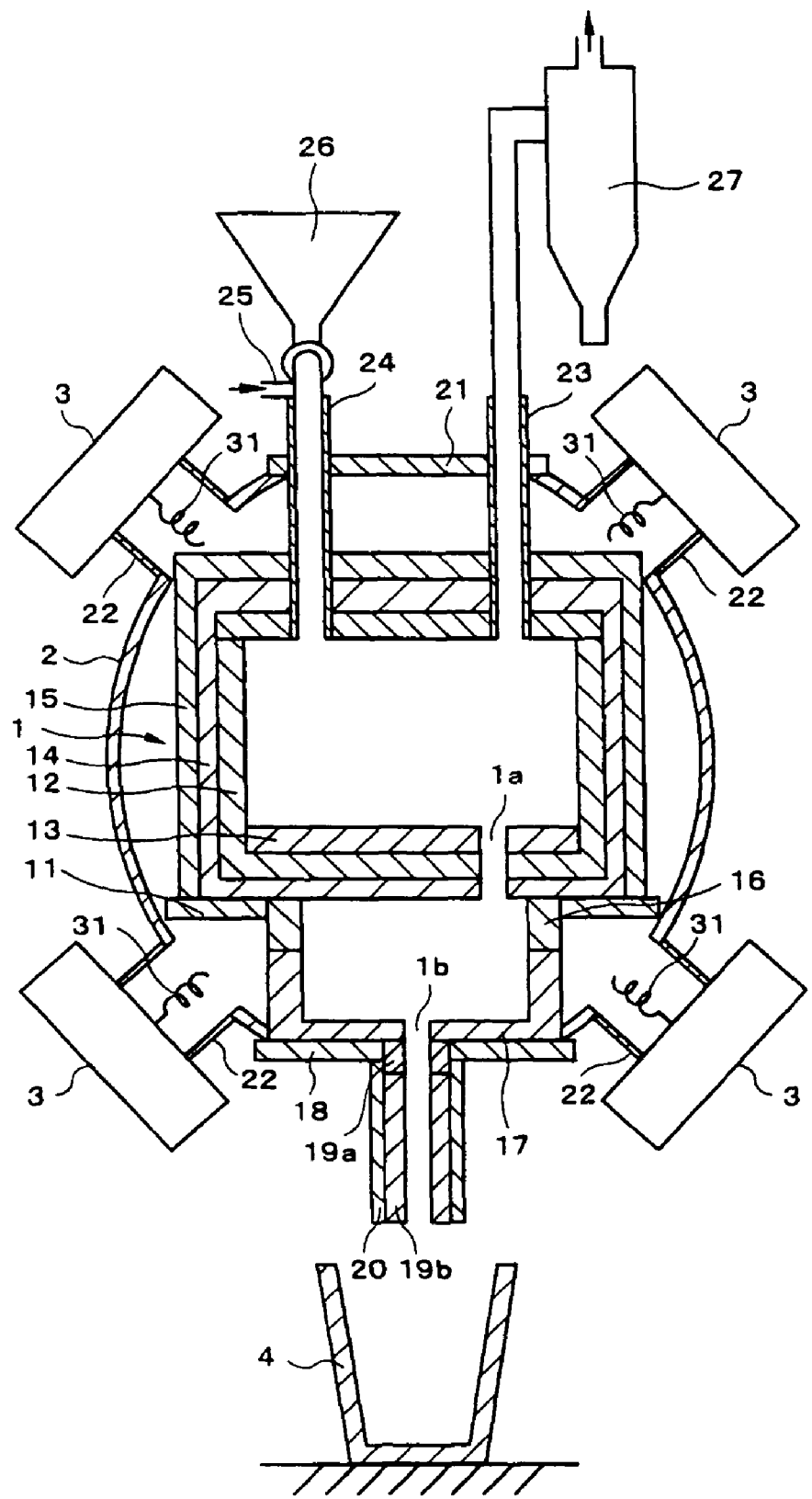
FIG. 1 is a diagram showing a microwave-heated continuous iron-making furnace according to an embodiment of the present invention.

An embodiment of the present invention is described in detail below with reference to the attached diagrams. FIG. 1 is a cross-sectional view showing a microwave-heated continuous iron-making furnace according to an embodiment of the present invention. A reactor 1 is disposed inside an iron cylindrical furnace 2. This reactor 1 is configured by placing a casing 12 composed of an MgO-based refractory over an iron plate 11, and a bottom plate 13 composed of an MgO-graphite mixed refractory is provided on the bottom surface of the casing 12. A blanket 14 composed of alumina fibers is disposed around the outer surfaces of the casing 12 so as to cover the side surfaces and bottom surface of the casing 12, and a thermally insulating board 15 is further placed on the outer side of the blanket 14. A hole 1a for extracting molten iron is formed in the bottom of the reactor 1.

Part of the bottom of the iron furnace 2 is recessed, and an iron plate-shaped lid 18 is fixed horizontally in this recession. A graphite crucible 17 is placed on this lid 18, and the top end of the vertical wall of the crucible 17 is joined to the bottom surface of the casing 12 by a cylindrical MgO-based refractory 16.

A hole 1b for extracting molten iron is provided in the bottom of this crucible 17, and a cylindrical graphite nozzle 19a aligned with the center of this hole 1b is fixed to the bottom surface of the crucible 17 so that the axis of the nozzle is vertical. An iron pipe 20 is fixed to the bottom surface of the lid 18 so that the axis of the pipe is vertical, and the pipe is coaxial with the graphite nozzle 19a. The graphite nozzle 19a is fitted with the top of the iron pipe 20, and a cylindrical nozzle 19b composed of an MgO-based refractory is fitted with the bottom of the iron pipe 20. Therefore, the graphite nozzle 19a and the nozzle 19b composed of an MgO-based refractory are supported on the iron pipe 20, and are disposed so that their axial directions are vertical.

The furnace 2 is supported by a suitable supporting device, and a ladle 4 is disposed below the nozzle 19b provided in the bottom of the furnace 2.

Four cylindrical protrusions 22 are formed at four approximately equal intervals in the furnace 2, and a microwave oscillator 3 is placed at the end of each protrusion 22. Each of the microwave oscillators 3 is provided with a helical antenna 31, and the microwave oscillators 3 are installed with the directional angles of the antennas slightly misaligned so that the directivities of the helical antennas 31 do not coincide among the microwave oscillators 3 which face each other across the center of the furnace 2.

Part of the top of the iron furnace 2 is recessed, and an iron plate-shaped lid 21 is disposed in this recession. In this iron lid 21, water-cooled iron pipes 23, 24 are placed so that their axial directions are vertical and so that the pipes pass through the lid 21. The lower parts of the water-cooled iron pipes 23, 24 pass through the heads of the casing 12, the blanket 14, and the thermally insulating board 15, and these lower parts communicate with the interior of the casing 12. The upper part of the water-cooled iron pipe 23 is connected to a cyclone 27, and after the gas released from the interior of the reactor 1 is cleaned in the cyclone 27, the gas is released as exhaust to the exterior. A hopper 26 is connected to the top part of the water-cooled iron pipe 24, and an inlet 25 for $N_2$ gas is placed in proximity to the connection between the hopper 26 and the water-cooled iron pipe 24. A raw material powder containing an iron ore powder, a coke powder, a graphite powder, and a coal powder or another such carbon source is stored in the hopper 26, and $N_2$ gas is blown from the inlet 25 into the iron pipe 24, whereby the $N_2$ gas acts as a carrier to supply the raw material powder in the hopper 26 to the reactor 1.

The following is a description of the action of the microwave iron-making furnace configured as described above. To continuously manufacture pig iron, raw material is continuously loaded into the reactor 1 from the hopper 26 through the water-cooled iron pipe 24. The microwave oscillators 3 are driven and the interior of the reactor 1 is irradiated with microwaves via the antennas 31. Microwaves irradiate the interior of the space enclosed by the casing 12 of the reactor 1, and the iron ore powder, the graphite powder, the coal powder, and the like supplied from the hopper 26 absorb the microwaves. These powders are self-heated and their temperature increases. The iron ore powder, the graphite powder, and the coal powder or other such carbon source thereby react, the iron ore is reduced and melted, and molten pig iron accumulates on the bottom plate 13 composed of an MgO-graphite mixed refractory. This molten pig iron falls through the hole 1a onto the crucible 17, and further passes through the hole 1b provided in the crucible 17, and then through the nozzles 19a, 19b to be supplied to the ladle 4.

To prevent microwaves from leaking to the outside of the furnace, the water-cooled iron pipes 23, 24 must sufficiently be in contact with the iron furnace 2. Since the iron pipes 23, 24 are disposed in proximity to the furnace frame of the reactor 1 and are exposed to high temperatures of 1300 to 1500° C., the distal ends of the pipes 23, 24 must be water-cooled.

When the molten pig iron is extracted to the outside of the reactor, the molten pig iron piles up, and the molten pig iron itself acts as an antenna and leaks microwaves to the outside of the furnace. Therefore, to prevent this microwave leakage, the molten pig iron must be in sufficient contact with the furnace frame (the inner surface of the casing 12). In view of this, the molten pig iron that flows out of the reactor 1 through the hole 1a is received by the graphite crucible 17 which is in sufficient electrical contact with the furnace frame. Since the pig iron has the same electric potential as the furnace frame (the casing 12) through the graphite crucible, the pig iron acts as an antenna even if it continuously flows out of the furnace, and microwaves do not leak to the outside of the furnace. If the graphite crucible 17 were to not be in sufficient electrical contact with the furnace frame, the difference in electric potential between the furnace interior and furnace exterior with regards to the continuing molten pig iron would cause the electric current generated in the surface of the molten pig iron by the microwaves in the furnace to flow out of the furnace, and the electric current would become microwaves and leak out of the furnace. The magnesia-based refractory 16 having low microwave absorption is disposed at the top part of the vertical wall of the crucible 17 and does not let microwaves through. The graphite crucible 17 reflects microwaves and therefore does not let microwaves through. Consequently, the microwaves emitted from the lower microwave oscillators 3 are not blocked by the MgO-based refractory 16 and are directed to the raw material inside the reactor 1. Furthermore, the microwaves emitted from the upper microwave oscillators 3 cause a reaction in the unreacted raw material floating in the molten pig iron that has flowed out of the reactor 1, and pig iron is created.

The crucible 17 is heated as necessary with a heater or the like. An outlet port (hole 1b) with an on-off valve (not shown) is placed in the bottom of the crucible, the on-off valve is opened either continuously or intermittently, and the molten pig iron flows into the ladle 4. Furthermore, to prevent microwave leakage, a metal pipe (iron pipe 20) having a pipe diameter and length corresponding to the wavelengths of the microwaves is placed in the outlet port, the interior of the pipe is lined with a nozzle 19b composed of a magnesia-based refractory, and the molten pig iron is received in the ladle 4 outside of the furnace via this nozzle 19b. The microwaves that pass through the interior of the iron pipe 20 become open-ended with regards to the microwaves in the exit, and standing waves are formed. Therefore, in a pipe that has a certain length in relation to its inside diameter, the microwaves are reflected at the open ends and are damped without leaking to the exterior. For example, in cases in which the frequency of the microwaves is 2.45 GHz, the microwaves are damped by 23 dB in a pipe having an inside diameter of 50 mm and a length of 50 mm. The magnesia-based refractory lining the interior reacts and dissolves when the iron pipe is soaked with pig iron, and is therefore lined over the inner surface of the iron pipe 20 to prevent this from happening.

The molten pig iron produced in the reactor 1 flows continuously into the graphite crucible 17 through the hole 1b placed in the floor of the furnace. Unreacted raw material and slagged or unslagged gangue components float on this molten pig iron, and flow out with the pig iron. The unreacted raw material in these floating materials is reacted in the crucible 17 by microwaves reflected from above, producing pig iron. The slag floating on the molten pig iron flows with the pig iron out to the ladle 4 outside of the furnace.

A mixed gas containing CO gas and $CO_2$ gas is also produced from the reactor 1. This exhaust gas is released to the exterior of the furnace via the water-cooled iron pipe 23. At this time, some unreacted raw material powder scatters into the exhaust gas and is therefore recovered by the cyclone 27 or the like.

Thus, iron ore is reduced to produce molten pig iron from a raw material containing iron ore and coal powder by microwave irradiation. At this time, the frame 2 of the microwave furnace must be made of iron, stainless steel, or another such structural material that does not let microwaves through, and must also be tightly sealed so that microwaves do not leak. However, the seal does not need to be airtight.

The microwave generator theoretically has a power requirement of 50 kW per ton of daily pig iron output, but with a 50% conversion efficiency of energy for heating and reacting the raw material from electricity, a 100 kW electric generator is required.

Examples of the microwave-transmitting antennas 31 include waveguide antennas and helical antennas. With the former, energy expands in the furnace and reflects off the wall and the like to become uniform, but is dampened whenever it reflects off the wall. When heated materials are loaded therein, proximal energy is absorbed by the raw material, and many unheated materials can therefore be heated all together. Since the latter are directional, the energy density in the limited area in the furnace can be increased and the loss caused by reflection on the wall can be reduced by using a plurality of helical antennas.

When raw materials are loaded in this state, the raw materials can be effectively heated. The interior of the furnace is filled with nitrogen gas supplied via the water-cooled iron pipe 24, and the produced CO and $CO_2$ gases are released via the water-cooled iron pipe 23. When the furnace interior becomes full with CO and $CO_2$ gases, plasma is generated, energy is lost, and the gases must therefore be quickly released to the outside of the furnace. Therefore, approximately two liters of nitrogen gas per cubic meter of the internal volume of the furnace preferably flow through every minute. For reference, when 1 kg of iron is manufactured, approximately 0.5 $m^3$ of CO and $CO_2$ gases are produced, assuming an exhaust gas temperature of 300° C.

The microwaves are intensively absorbed by the raw material (iron ore powder and carbon powder) in the reactor 1, and the temperature of the raw material rapidly increases. The reduction reaction and carbon absorption into the reduced iron progress quickly, and molten pig iron is produced. The refractory in the furnace holding the raw material must in principle be a material that does not absorb microwaves, that does not react with iron oxide (FeO, $Fe_2O_3$), and that has a refractory temperature of 1500° C. or greater. It is actually preferable to use a material which, at the same weight as the raw material, generates about 30% or less of the amount of heat generated by the raw material from microwave absorption. A magnesia-based refractory is such a refractory.

The reaction of the raw material is an endothermic reaction, and a temperature of 1300 to 1500° C. is required in order to produce molten pig iron. To constantly maintain this temperature, the bottom plate 13 composed of a refractory that generates heat is placed on the floor of the furnace, and the molten pig iron must be kept at a temperature of 1300 to 1500° C. The refractory in the floor of the furnace is preferably a material which, at the same weight as the raw material, generates about 30 to 50% of the amount of heat generated by the raw material from microwave absorption. A good option for the refractory is a material that does not react simultaneously with the iron oxide and dissolve. For example, it is preferable to use a magnesia-based cement mixed with 10 to 30% of graphite, or a refractory obtained by mixing graphite with magnesia.

Installing a separate heater or burner in the furnace before the reactor is operated and heating the reactor to 1300 to 1500° C. also has the effect of increasing the rate of the reduction reaction and the rate of molten pig iron manufacturing. When the raw material is heated in advance, this has the effect of increasing the rate of the iron ore reduction reaction and the rate of molten pig iron manufacturing. Since the produced molten pig iron does not in principle absorb microwaves, the molten pig iron condenses on the moving furnace floor and can be recovered. In this case, a magnesia-based refractory is used in the furnace floor; i.e., in the bottom plate 13.

A material that does not in principle absorb microwaves; i.e., a material that does not self-heat even when exposed to microwaves is preferably used for the material (the casing 12, the blanket 14, the thermally insulating board 15) for covering and thermally insulating the periphery of the furnace. It is actually preferable to use a material which, at the same weight as the raw material, generates about 20% or less of the amount of heat generated by the raw material from microwave absorption; and that has a refractory temperature of 1400° C. or greater. A fibrous blanket made of alumina is preferably used as such a material. Furthermore, a thermally insulating board made of mullite is preferably placed on the exterior.

According to the present invention, iron ore can be reduced by microwave heating to obtain pig iron instead of using conventional blast-furnace iron-making. Therefore, the present invention contributes greatly to improving energy efficiency and reducing equipment size in the iron-making process.

What is claimed is:

1. A microwave iron-making furnace, comprising:
   a reactor having a casing and a blanket for covering a side, bottom, and top surface of the casing;
   a microwave oscillator for irradiating an interior of the reactor with microwaves;
   a raw material powder supply apparatus for supplying a raw material powder containing iron ore and a carbon source to the interior of said reactor; and
   an extraction part for extracting molten iron from the reactor,
   wherein said microwave oscillator directs, into the interior of the reactor, microwaves that have been imparted with directivity using a helical antenna,
   wherein the raw material powder in the reactor is irradiated and heated by the microwaves from the microwave oscillator that have been imparted with directivity by the helical antenna,
   wherein the iron ore is reduced using the carbon source, and
   wherein the molten iron is obtained.

2. The microwave iron-making furnace according to claim 1, wherein said extraction part comprises a hole opened in a bottom of said reactor, and a crucible comprising graphite for receiving molten pig iron that flows out through said hole is provided below said reactor.

3. The microwave iron-making furnace according to claim 2, wherein a cylinder comprising a magnesia-based refractory is provided between said crucible and a bottom surface of said reactor, and a space enclosed by said reactor, said cylinder, and said crucible is formed below said reactor.

4. The microwave iron-making furnace according to claim 3, wherein a nozzle is formed in a bottom surface of said crucible, and molten pig iron flowing out of said reactor into said crucible is poured from said nozzle into a ladle provided below the nozzle.

* * * * *